United States Patent
Trivedi et al.

(10) Patent No.: US 8,295,884 B2
(45) Date of Patent: Oct. 23, 2012

(54) METHOD AND SYSTEM FOR PROVIDING DIGITAL COMPENSATION AND VECTOR CALIBRATION FOR A BASE STATION IN A WIRELESS NETWORK

(75) Inventors: Akshaya A. Trivedi, Mountain View, CA (US); Yinong Ding, Plano, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 1011 days.

(21) Appl. No.: 11/284,782

(22) Filed: Nov. 22, 2005

(65) Prior Publication Data

US 2007/0117559 A1    May 24, 2007

(51) Int. Cl.
*H04M 1/00* (2006.01)
(52) U.S. Cl. ............ 455/561; 455/423; 455/562.1
(58) Field of Classification Search .......... 455/423, 455/561, 562.1
See application file for complete search history.

(56) References Cited

U.S. PATENT DOCUMENTS

| | | | |
|---|---|---|---|
| 5,914,931 A * | 6/1999 | Kang et al. | 370/203 |
| 6,037,898 A * | 3/2000 | Parish et al. | 342/174 |
| 6,738,020 B1 * | 5/2004 | Lindskog et al. | 342/377 |
| 2002/0155818 A1 * | 10/2002 | Boros et al. | 455/67.4 |
| 2004/0136313 A1 * | 7/2004 | Goldstein et al. | 370/203 |
| 2005/0047384 A1 * | 3/2005 | Wax et al. | 370/338 |
| 2006/0007885 A1 * | 1/2006 | Pollack et al. | 370/328 |
| 2006/0009162 A1 * | 1/2006 | Tan et al. | 455/67.11 |

* cited by examiner

*Primary Examiner* — Dwayne Bost
*Assistant Examiner* — Yungsang Lau

(57) ABSTRACT

A method for providing digital compensation and vector calibration for a base station in a wireless network is provided. The method includes performing a single process that is operable to provide simultaneously both digital compensation and vector calibration for the base station. According to one embodiment of the present disclosure, the single process is performed by receiving a transmitted signal based on a compensation/calibration (C/C) signal, processing the received signal, generating a C/C weight based on the processed signal, and using the C/C weight in a normal operational mode for the base station.

20 Claims, 3 Drawing Sheets

# METHOD AND SYSTEM FOR PROVIDING DIGITAL COMPENSATION AND VECTOR CALIBRATION FOR A BASE STATION IN A WIRELESS NETWORK

TECHNICAL FIELD OF THE INVENTION

The present disclosure relates generally to wireless communications and, more specifically, to a method and system for providing digital compensation and vector calibration for a base station in a wireless network.

BACKGROUND OF THE INVENTION

In a base station of a wireless communication network, the antenna is the port through which radio frequency (RF) energy is coupled from the transmitter to the outside world and to the receiver from the outside world. By using an array of antennas, a number of benefits are expected including improved directionality, higher signal-to-noise ratio (SNR), and better capability of interference rejection for received signals.

Calibration systems play an important role in modern wireless communication systems employing adaptive antenna technologies, such as antenna arrays. Depending on the applications and the signal processing algorithms employed by the base station, antenna array calibration includes determining the characteristics of the RF paths of the base station and using the characteristic data to optimize base station radio transmission and radio reception. Smart antenna systems particularly may benefit from the enhanced system performance that can be obtained from calibration.

In addition to calibrating the antenna array, conventional base stations typically provide for some form of compensation to remove phase effects introduced into signals transmitted from and received by the base station by analog components, filters and the like within the base station. Thus, these conventional base stations generally require not only a process to calibrate the antenna array, but also a process to compensate for the distortions that are a result of these phase effects.

Therefore, there is a need in the art for an improved digital compensation and vector calibration method for wireless networks. In particular, there is a need for a single method for providing both digital compensation and vector calibration for a base station in a wireless network.

SUMMARY OF THE INVENTION

A method for providing digital compensation and vector calibration for a base station in a wireless network is provided. The method comprises performing a single process that is operable to provide simultaneously both digital compensation and vector calibration for the base station.

According to one embodiment of the present disclosure, the single process is performed by receiving a transmitted signal based on a compensation/calibration (C/C) signal, processing the received signal, and generating a C/C weight based on the processed signal.

According to another embodiment of the present disclosure, the single process is also performed by using the C/C weight in a normal operational mode for the base station.

According to still another embodiment of the present disclosure, the single process is also performed by generating the C/C signal, and transmitting a signal based on the C/C signal.

According to yet another embodiment of the present disclosure, the single process is performed by generating a compensation/calibration (C/C) signal at the base station, providing the C/C signal through a transmit chain of the base station to an antenna array of the base station, transmitting the provided signal from the antenna array to a compensation processor, receiving the transmitted signal at the compensation processor, comparing the received signal to the C/C signal at the compensation processor, and generating at the compensation processor a transmit C/C weight based on the comparing of the received signal to the C/C signal.

According to a further embodiment of the present disclosure, the single process is also performed by providing the transmit C/C weight from the compensation processor to the base station and using the transmit C/C weight in a normal transmit operational mode for the base station.

According to a still further embodiment of the present disclosure, the single process is performed by generating a compensation/calibration (C/C) signal at a compensation processor, transmitting the C/C signal from the compensation processor to an antenna array of the base station, receiving the transmitted signal at the antenna array, supplying the transmitted signal from the antenna array through a receive chain of the base station to a receive processor of the base station, processing the supplied signal at the receive processor, providing the processed signal from the receive processor to the compensation processor, comparing the provided signal to the C/C signal at the compensation processor, and generating at the compensation processor a receive C/C weight based on the comparing of the provided signal to the C/C signal.

According to yet a further embodiment of the present disclosure, the single process is also performed by providing the receive C/C weight from the compensation processor to the base station and using the receive C/C weight in a normal receive operational mode for the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
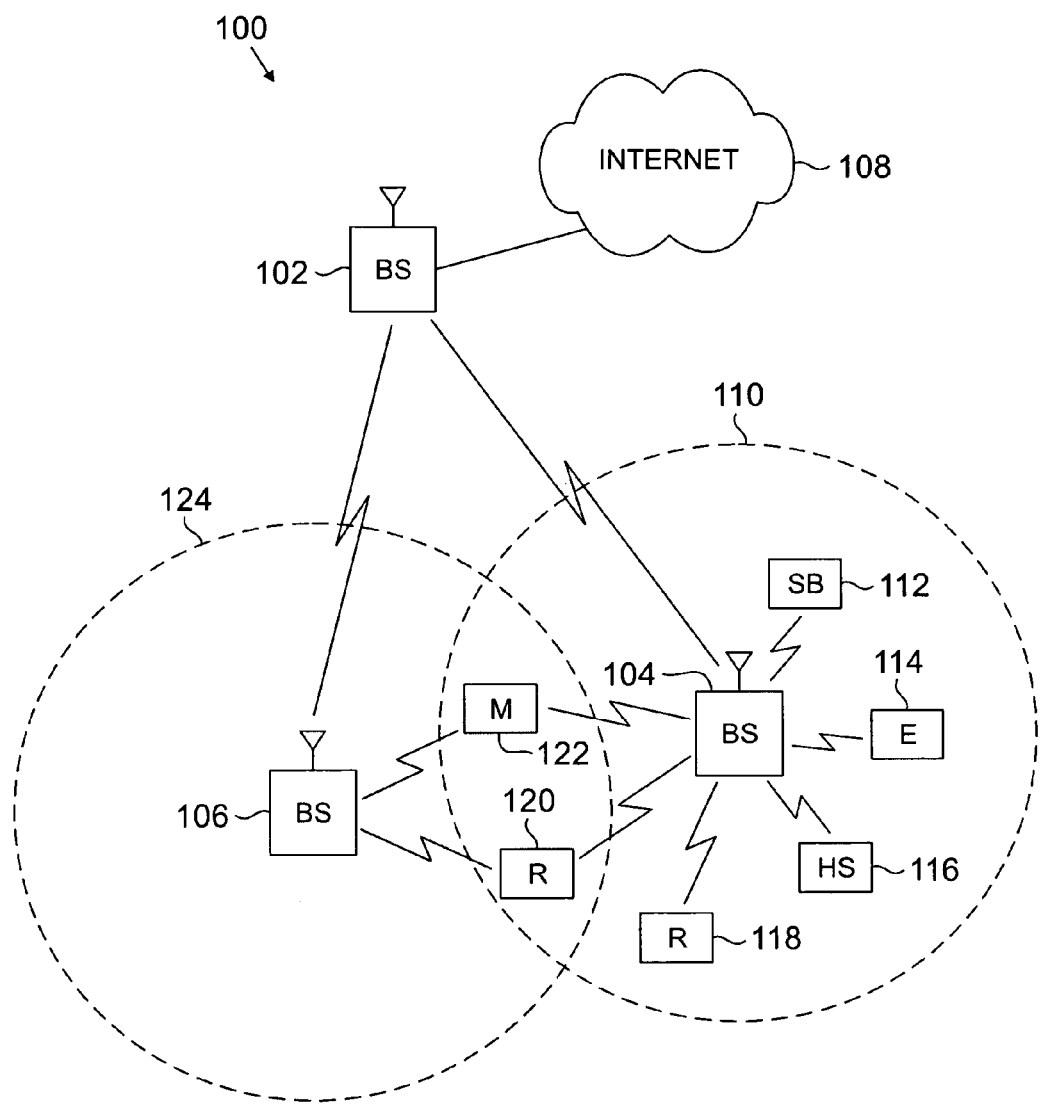
FIG. 1 illustrates an exemplary wireless network that is capable of providing digital compensation and vector calibration for a base station in a wireless network according to one embodiment of the present disclosure.
Figure 2:
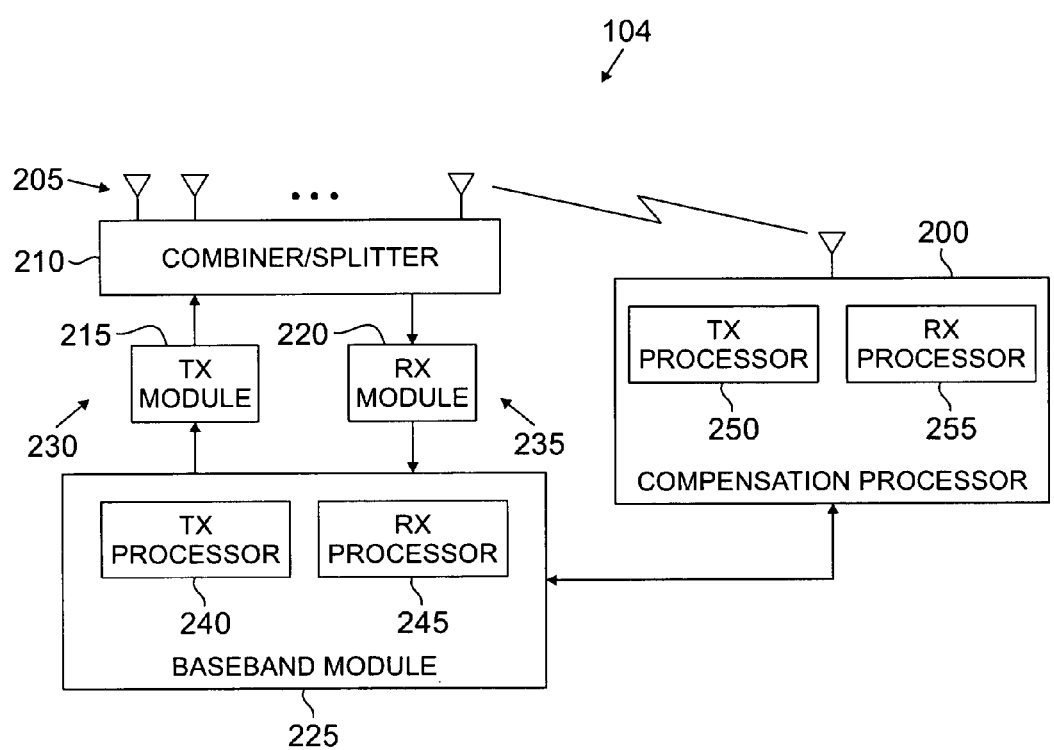
FIG. 2 illustrates an exemplary base station that is capable of providing digital compensation and vector calibration according to one embodiment of the present disclosure.
Figure 3:
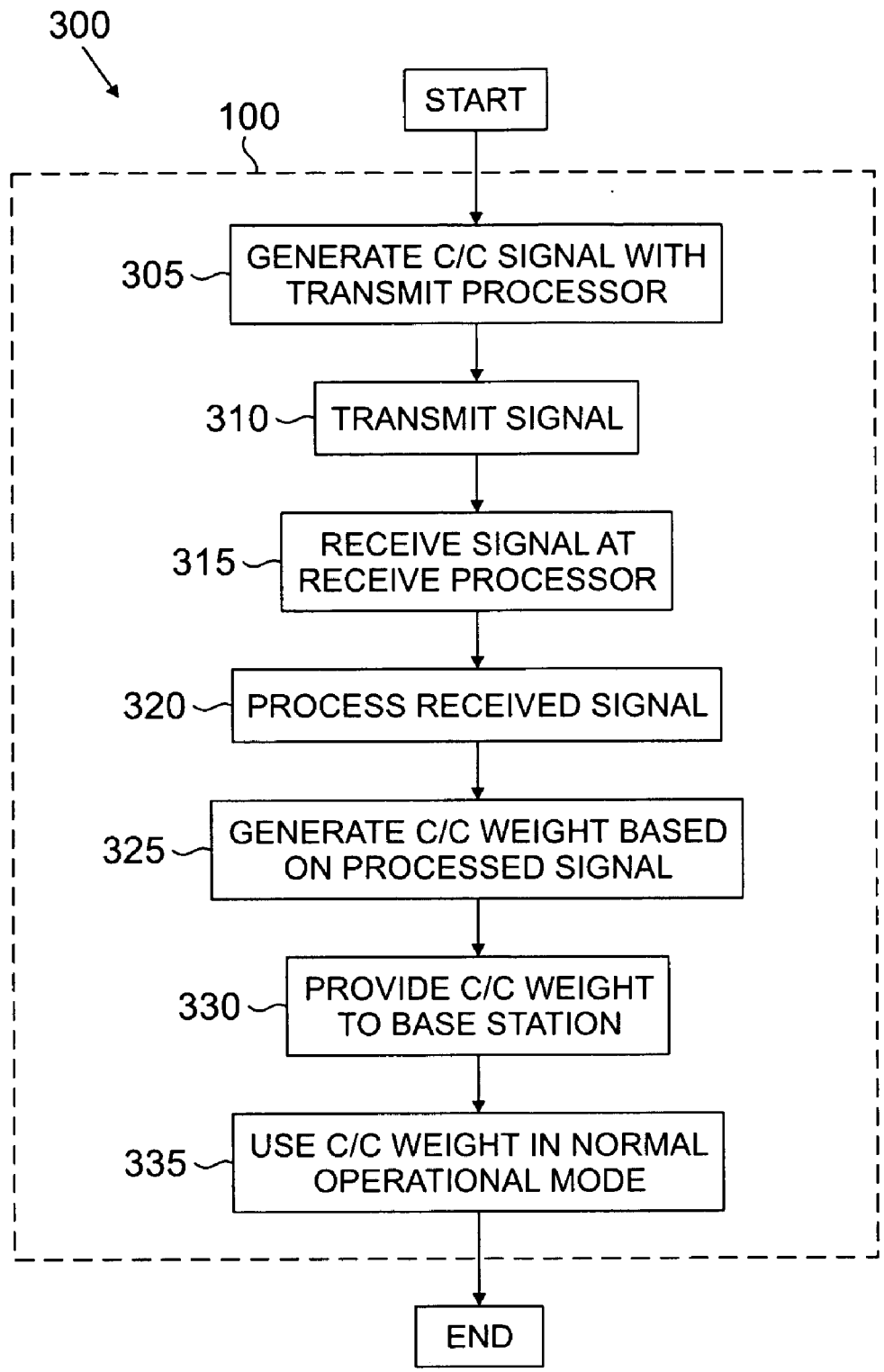
FIG. 3 is a flow diagram illustrating a method for providing digital compensation and vector calibration for the base station of FIG. 2 according to one embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

FIG. 1 illustrates an exemplary wireless network 100 that is capable of providing digital compensation and vector calibration for base stations according to several embodiments of the present disclosure. In an embodiment, the wireless network 100 includes a first base station 102 that is in communication with a second base station 104 and a third base station 106. The first base station 102 is in communication with an Internet 108. The second base station 104 provides wireless broadband access to the Internet 108, via the first base station 102, to a plurality of subscriber stations (SSs) within a coverage area 110 of the second base station 104 including a first SS 112 in a small business, a second SS 114 in an enterprise, a third SS 116 in a WiFi hotspot, a fourth SS 118 in a first residence, a fifth SS 120 in a second residence, and a sixth SS 122 in a mobile device. The third base station 106 provides wireless broadband access to the Internet 108, via the first base station 102, to a plurality of SSs within a coverage area 124 of the third base station 106 including the fifth SS 120 and the sixth SS 122. In other embodiments, the first base station 102 may be in communication with either fewer or more base stations. Additionally, while only six SSs have been depicted in FIG. 1 to avoid cluttering the drawing, it is understood that in an embodiment the wireless network 100 may be expected to provide wireless broadband access to many more than six SSs.

Note that the fifth SS 120 and the sixth SS 122, associated with the second residence and the mobile device respectively, are on the edge of the two coverage areas 110 and 124. The fifth SS 120 and the sixth SS 122 each communicate with both the second base station 104 and the third base station 106 and may be said to be operating in soft handoff. The concept of wireless handoff was developed to describe the need in cellular mobile phone networks to maintain voice calls as a cell phone passes into and out of possibly several different cell areas. In a hard handoff, a first communication link with the cell phone supported by a first cell would be taken down before a second communication link with the cell phone supported by a second cell would be established. In a soft handoff, the first communication link with the cell phone supported by the first cell would remain until after the second communication link with the cell phone supported by the second cell would be established, such that for a transient time both the first and second communication links were active concurrently and the cell phone was in communication concurrently with both the first and the second cell. The sixth SS 122, associated with the mobile device, may be in soft handoff for a transient period of time as the sixth SS 122 transits the overlap of the two coverage areas 110 and 124, for example, as a vehicle housing a wireless-enabled laptop computer drives along a road. The fifth SS 120, associated with the second residence, however, may remain in soft handoff for an indefinitely long period of time, for example, from ten minutes to a plurality of weeks.

In an embodiment, the base stations 102, 104, and 106 may communicate with each other and with the SSs 112, 114, 116, 118, 120, 122 using an IEEE 802.16, an IEEE 802.11, or an IEEE 802.20 wireless metropolitan area network standard, for example, an IEEE 802.16e standard. In another embodiment, however, a different wireless protocol may be employed, for example, a HIPERMAN wireless metropolitan area network standard. The first base station 102 may communicate through direct line-of-sight with the second base station 104 and the third base station 106. The second base station 104 and the third base station 106 may each communicate through non-line-of-sight with the SSs 112, 114, 116, 118, 120, and 122 using orthogonal frequency division multiplex (OFDM) techniques.

The second base station 104 may provide a T1 level service to the second SS 114 associated with the enterprise and a fractional T1 level service to the first SS 112 associated with the small business. The second base station 104 may provide wireless backhaul for the third SS 116 associated with the WiFi hotspot, which may be located in an airport, café, hotel, college campus or the like. The second base station 104 may provide digital subscriber line (DSL) level service to the fourth, fifth, and sixth SSs 118, 120, and 122. The SSs 112-122 may use the broadband access to the Internet 108 to access voice, data, video, video teleconferencing, and/or other broadband services. In an embodiment, one or more of the SSs 112-122 may be associated with an access point (AP) of a WiFi WLAN. The sixth SS 122 may include any of a number of mobile devices including a wireless-enabled laptop computer, personal data assistant, notebook, handheld device, or other wireless-enabled device. The fourth and fifth SSs 118 and 120 may include a wireless-enabled personal computer, laptop computer, gateway, or other device.

Dotted lines show the approximate extents of the coverage areas 110 and 124, which are shown as approximately circular for the purposes of illustration and explanation only. It should be clearly understood that the coverage areas associated with base stations, for example, the coverage areas 110 and 124 associated with the second base station 104 and the third base station 106, may have other shapes, including irregular shapes, depending upon the configuration of the base stations and the radio environment that may depend upon natural and man-made obstructions. Additionally, the coverage areas associated with base stations are not constant over time and may be imagined to "breathe"—expanding or contracting or changing shape—based on changing transmission power levels of the base station and/or the SSs, weather conditions, and other factors. In an embodiment, the radius of the coverage areas of the base stations, for example, the coverage areas 110 and 124 of the base stations 104 and 106, may extend in the range from about 2 kilometers to about fifty kilometers from the base stations.

As is well known in the art, a base station, such as base station 102, 104, and 106, may employ directional antennas to support a plurality of sectors within the coverage area. While in FIG. 1 the base stations 104 and 106 are depicted approximately in the center of their associated coverage areas 110 and 124, in other embodiments use of directional antennas may locate the base station near the edge of the coverage area, for example, at the point of a cone-shaped or pear-shaped coverage area.

The connection to the Internet 108 from the base station 102 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to the Internet 108 may be provided by different network nodes and equipment.

According to an embodiment of the present disclosure described in more detail below in connection with FIG. 2, base stations 104 and 106 of wireless network 100 are each operable to digitally equalize a transmit chain and a receive chain of the base station 104, 106 by generating a compensation/calibration (C/C) weight for each of the chains for use in transmitting data from and receiving data at the base station 104, 106. The use of the C/C weights results in both the digital compensation of the transmit and receive chains and the vector calibration of the antenna array for the base station 104, 106.

FIG. 2 illustrates base station 104 in greater detail according to an embodiment of the present disclosure. Base station 104 is illustrated by way of example only. However, it will be understood that the components illustrated and described with respect to base station 104 are also part of base stations 106 and 102. According to one embodiment, base station 104 comprises compensation processor 200, antenna array 205, combiner/splitter 210, transmit (TX) module(s) 215, receive (RX) module(s) 220, and baseband module(s) 225. A single antenna path, which comprises one transmit module 215, one receive module 220 and one baseband module 225, is illustrated for simplicity; however, it will be understood that each antenna of antenna array 205 is associated with a corresponding antenna path. In addition, it will be understood that base station 104 may comprise additional components not illustrated in FIG. 2.

Compensation processor 200 may comprise a separate card coupled to and operable to communicate with base station 104 or may be integrated into base station 104. Compensation processor 200 is operable to transmit signals to base station 104 and to receive signals transmitted from base station 104 in order to provide digital compensation and vector calibration for base station 104 by digitally equalizing a transmit chain 230 and a receive chain 235 for base station 104. Although illustrated as coupled to baseband module 225, it will be understood that for other embodiments compensation processor 200 may be coupled to a radio frequency module (not shown in FIG. 2) of base station 104 or other suitable component.

Antenna array 205 is operable to transmit forward channel signals received from transmit module 215, through combiner/splitter 210, to subscriber stations 112-122 in the coverage area of base station 104 and to compensation processor 200. Antenna array 205 is also operable to send to receive module 220, through combiner/splitter 210, reverse channel signals received from subscriber stations 112-122 in the coverage area of the base station 104 and from compensation processor 200. According to one embodiment of the present disclosure, antenna array 205 comprises a smart antenna in a multiple input, multiple output (MIMO) or single input, single output (SISO) communication system. However, it will be understood that antenna array 205 may comprise any suitable type of antenna array.

Combiner/splitter 210 may comprise an antenna selection unit to select among different antennas in antenna array 205 during both transmit and receive operations. Combiner/splitter 210 is operable to combine a plurality of transmitted signals to generate a single output signal and to split a single input signal to generate a plurality of received signals. The combiner/splitter 210 is designed to ensure the uniformity of electrical characteristics between transmit and receive modules 215, 220 across antenna array 205. For a particular embodiment, combiner/splitter 210 may use micro-strips to achieve symmetry and uniform coupling between the paths to transmit and receive modules 215, 220. The use of micro-strip coupling may assure symmetrical coupling variances due to manufacturing tolerances and/or due to environmental changes, such as temperature changes. For another embodiment, combiner/splitter 210 may use devices based on Micro-Electro-Mechanical System (MEMS) technologies. However, it will be understood that combiner/splitter 210 may use any other suitable technology.

Transmit module 215 is operable to up-convert digital baseband signals received from baseband module 225 to generate analog radio frequency (RF) signals for transmission by antenna array 205. The transmit chain 230 that is operable to be equalized comprises the path through transmit module 215 and combiner/splitter 210 to the antennas of antenna array 205. Transmit chain 230 may comprise digital-to-analog converters, baseband filters, and other components that are capable of contributing to group delay (non-linear phase) and amplitude ripple across the band.

Receive module 220 is operable to down-convert analog RF signals received from antenna array 205 to generate digital baseband signals for processing by baseband module 225. The receive chain 235 that is operable to be equalized comprises the path from the antennas of antenna array 205 through combiner/splitter 210 and receive module 220. Receive chain 235 may comprise analog-to-digital converters, baseband filters, SAW filters, and other components that are capable of contributing to group delay and amplitude ripple across the band.

Baseband module 225 comprises a transmit processor 240 and a receive processor 245. Transmit processor 240 of baseband module 225 is operable to generate an outgoing signal to be transmitted from base station 104. The outgoing signal is provided to transmit module 215, which converts the digital outgoing signal into an analog signal, up-converts the baseband signal to an RF signal, and provides the analog, RF outgoing signal to combiner/splitter 210. Combiner/splitter 210 then provides the outgoing signal to antenna array 205 for transmission.

Similarly, receive processor 245 of baseband module 225 is operable to process an incoming signal received at base station 104. Incoming signals may be received at combiner/splitter 210 from antenna array 205. Combiner/splitter 210 provides the incoming signal to receive module 220, which down-converts the RF incoming signal into a baseband signal, converts the analog baseband signal into a digital baseband signal, and provides the digital, baseband incoming signal to receive processor 245 of baseband module 225.

Compensation processor 200 also comprises a transmit processor 250 and a receive processor 255. Transmit processor 250 of compensation processor 200 may be operable to generate C/C signals for use in providing digital compensation and vector calibration for receive chain 235 and is operable to generate a receive C/C weight for use by receive processor 245 of base station 104 during normal operational mode. Similarly, receive processor 255 of compensation processor 200 may be operable to generate C/C signals for use in providing digital compensation and vector calibration for transmit chain 230 and is operable to generate a transmit C/C weight for use by transmit processor 240 of base station 104 during normal operational mode.

For compensation processor 200 to generate or produce a transmit C/C weight, an outgoing C/C signal is generated by transmit processor 240. Compensation processor 200 may generate the outgoing C/C signal to be used and provide the C/C signal to transmit processor 240 or, alternatively, transmit processor 240 may generate the C/C signal and provide the C/C signal directly to compensation processor 200. In this way, compensation processor 200 may determine the distortion present in transmit chain 230 based on the signal received from antenna array 205 as compared to the original outgoing C/C signal. This process of generating transmit c/c weight(s) is called TX vector calibration. For compensation processor 200 to generate or produce a receive C/C weight, receive processor 245 processes an incoming C/C signal and provides the processed signal to compensation processor 200. Compensation processor 200 may generate the incoming C/C signal to be used and provide the C/C signal to receive processor 245 or, alternatively, receive processor 245 may generate the C/C signal and provide the signal directly to compensation processor 200 for transmit by TX processor 250. In this way, compensation processor 200 may determine the distortion present in receive chain 235 based on the incoming signal received from receive processor 245 as compared to the original incoming C/C signal. This process of generating receive c/c weight(s) is called RX vector calibration.

Compensation processor 200 is operable to generate the C/C weights for transmit and receive chains 230 and 235, respectively, by analyzing the outgoing signal transmitted by antenna array 205 and by analyzing the incoming signal provided by receive processor 245, respectively. By comparing each of the received outgoing and incoming signals to expected outgoing and incoming signals, compensation processor 200 is able to generate the C/C weights that may be used by base station 104 to equalize transmit and receive chains 230 and 235 during normal operation.

After compensation processor 200 generates each of the C/C weights, compensation processor 200 is operable to provide the transmit C/C weight to transmit processor 240 and the receive C/C weight to receive processor 245. Transmit processor 240 may then use the transmit C/C weight when generating outgoing signals, and receive processor 245 may use the receive C/C weight when processing incoming signals.

Thus, transmit chain 230 is equalized by utilizing the transmit c/c weight(s) and receive chain 235 is equalized by utilizing the receive c/c weights. For a particular embodiment, each of the equalization processes may begin with the appropriate transmit processor 240, or 250, respectively, generating a value, $d_n$, as follows:

$d_n=1$, for $n=1,2,\ldots,9$ and $d_n=d_{n-4}+d_{n-9}$, for $n=10,11,\ldots,2N$, with N=1024 or any other suitable value. Based on these values, transmit processor 240, or 250 may perform a dibit to 4-QAM modulation according to the following table:

| $d_{2n+1}$ | $d_{2n+2}$ | 4-QAM |
|---|---|---|
| 0 | 0 | $1+j$ |
| 0 | 1 | $-1+j$ |
| 1 | 1 | $-1-j$ |
| 1 | 0 | $1-j$ |

Note that 2N d-values generate N 4-QAM symbols, s(k), k=0, 1, . . . , N−1.

Based on the 4-QAM modulation results, transmit processor 240, or 250 may generate an OFDM waveform based on the following equations:

$X_{ref}(k)=S(k)$, for $k=0,1,\ldots,(N_C-1)$, (where $N_c$ is a number less than or equal to N/2), $X_{ref}(N-k)=S(N-k)$, for $k=1,2,\ldots,N_c$, $X_{ref}(k)=0$, for all other k, and $X_{ref}(0)=0$.

Transmit processor 240, or 250 may then perform an inverse Fast Fourier Transform in the frequency domain on the generated $X_{ref}(k)$ to generate $x_{ref}[n]$ in the time-domain, after which the training sequence may be repeated a suitable number of times until a final training sequence, y(n), is generated based on the $x_{ref}[n]$ values. Transmit processor 240, or 250 may then transmit the final training sequence y(n) from base station 104 to compensation processor 200 (for transmit processor 240) or from compensation processor 200 to base station 104 (for transmit processor 250), respectively.

Based on the transmission of the final training sequence result, y(n), receive processor 255 receives a signal, r(n), from base station 104 or receive processor 245 receives a signal, r(n), from compensation processor 200. Receive processor 255, or 245 performs a Fast Fourier Transform on the received signal, r(n), respectively to generate a signal in the frequency domain as follows:

$R(k)=FFT(r(n))$, with n=0, 1, . . . , (N−1) and k=0, 1, . . . , (N−1). Receive processor 255, or 245 then generates another signal based on this transformed signal as follows:

$C(k)=R(k)*X_{ref}(k)$, with $X_{ref}(k)$ determined in advance as part of the system design.

Receive processor 255, 245 may then perform a correlation by inverse Fast Fourier Transforming C(k) in the frequency domain to generate c(n) in the time domain and by identifying a value of n that maximizes $|c(n)|^2$ (denoted as m). After correlation, receive processor 255 or 245 performs a frame alignment as follows:

$Q(k)=FFT(q(n))$, with q(n)=r(n−m). Finally, receive processor 255, or 245 may generate a C/C weight, $T_{comp}(k)$, as follows:

$T_{comp}(k)=X_{ref}(k)/Q(k)$.

The C/C weight may be used in transmitting a waveform, A(k), for example, by transmitting the waveform $A(k)*T_{comp}(k)$ instead. In this way, for OFDM systems, a new symbol may be formed on each subcarrier, k.

Non-OFDM systems, on the other hand, use pulse-shape filtering (a convolution of the baseband data with a pulse-shaping filter). These systems may use FFT to do convolution using an overlap-and-save method or an overlap-and-add method. When one of these methods is used, the FFT of the impulse response of the pulse-shape filter may be replaced by the product of the FFT of the impulse response of the pulse-shape filter and the transmit compensation weights, $T_{comp}$.

Thus, using this method for OFDM or non-OFDM systems, outgoing or incoming signal distortions introduced by components of transmit and receive chains 230, 235 may be removed (digitally compensated), while compensation is simultaneously provided for phase differences across the antennas in antenna array 205 (vector calibration). As used herein, "simultaneously" means that a single process results in both the digital compensation and the vector calibration of base station 104 instead of a separate process for each that may happen to be performed at the same time or that may be performed at different times.

FIG. 3 is a flow diagram illustrating a method 300 for providing digital compensation and vector calibration for transmit and receive chains 230, 235 of base station 104 according to one embodiment of the present disclosure. However, the description that follows also applies to the remaining base stations in wireless network 100. In addition, the following description applies to digital compensation and vector calibration for both transmit and receive chains 230, 235. However, it will be understood that the process is completed independently for each chain 230, 235.

Initially, a C/C signal is generated by base station (BS) transmit processor 240 for digital compensation and vector calibration of transmit chain 230 or by compensation processor (CP) transmit processor 250 for digital compensation and vector calibration of receive chain 235 (process step 305). The signal is then transmitted from base station 104 to compensation processor 200 for transmit chain 230 or from compensation processor 200 to base station 104 for receive chain 235 (process step 310). For transmit chain 230, the signal travels through transmit module 215 and combiner/splitter 210 before being provided to antenna array 205, where the signal is transmitted to compensation processor 200. For receive chain 235, the signal is transmitted from compensation processor 200 to antenna array 205 of base station 104.

The transmitted signal is eventually received at CP receive processor 255 for transmit chain 230 or at BS receive processor 245 for receive chain 235 (process step 315). For receive chain 235, the signal is provided by antenna array 205 to combiner/splitter 210 and receive module 220 before being received at BS receive processor 245. After being received at CP or BS receive processor 255 or 245, the signal is processed by that receive processor 255 or 245 (process step 320). In addition, for the signal received at and processed by BS receive processor 245, the processed signal is provided from BS receive processor 245 to CP transmit processor 250 for additional processing.

CP receive processor 255 (for transmit chain 230) or CP transmit processor 250 (for receive chain 235) then generates a C/C weight based on the processed signal (process step 325). For transmit chain 230, CP receive processor 255 generates a transmit C/C weight. For receive chain 235, CP transmit processor 250 generates a receive C/C weight. After generating the C/C weight, compensation processor 200 provides the C/C weight to base station 104 (process step 330). For transmit chain 230, compensation processor 200 provides the transmit C/C weight to BS transmit processor 240. For receive chain 230, compensation processor 200 provides the receive C/C weight to BS receive processor 245.

Base station 104 then uses the C/C weight when operating in a normal operational mode (process step 335). For transmit chain 230, BS transmit processor 240 generates signals for transmission from base station 104 based on the transmit C/C weight. For example, BS transmit processor 240 may multiply a signal to be transmitted by the transmit C/C weight before providing the signal to transmit module 215. For receive chain 235, BS receive processor 245 processes signals received at base station 104 based on the receive C/C weight. For example, BS receive processor 245 may multiply a received signal by the receive C/C weight.

By using the C/C weights during normal operation, phase effects introduced by transmit and receive chains 230 and 235 are removed and compensation is provided for phase differences across the antennas of antenna array 205. Thus, in this way, both digital compensation and vector calibration may be provided for base station 104 with a single process. It will be understood that a single process is performed for transmit chain 230 and another single process is performed for receive chain 235; however, for each chain 230 and 235, both digital compensation and vector calibration are provided in a single process.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of providing digital compensation and vector calibration for a base station coupled to an antenna array, the method comprising:
   generating a transmit compensation/calibration (C/C) weight;
   generating a receive C/C weight; and
   performing a single process that simultaneously provides both digital compensation and vector calibration by directly applying the transmit C/C weight when generating outgoing radio frequency (RF) signals through the antenna array and the receive C/C weight when receiving incoming RF signals through the antenna array;
   wherein the transmit C/C weight is generated by processing received outgoing RF signals that were received through at least one second antenna, the at least one second antenna being separate from the antenna array, the processing of the received outgoing RF signals configured to be performed by a compensation processor that is integrated into the base station; and
   wherein the receive C/C weight is generated by processing received incoming RF signals that were transmitted through the at least one second antenna.

2. The method as set forth in claim 1, wherein:
   generating the transmit C/C weight comprises:
      receiving an outgoing signal, the outgoing signal based on a transmit C/C signal,
      processing the received outgoing signal,
      generating the transmit C/C weight based on the processed outgoing signal; and generating the receive C/C weight comprises:
      receiving a processed incoming signal, the incoming signal based on a receive C/C signal, and
      generating the receive C/C weight based on the processed incoming signal.

3. The method as set forth in claim 2, wherein the transmit C/C weight and the receive C/C weight are used in a normal operational mode of the base station.

4. The method as set forth in claim 2, wherein:
   generating the transmit C/C weight further comprises:
      generating the transmit C/C signal; and
      sending the transmit C/C signal to a baseband transmit processor; and
   generating the receive C/C weight further comprises:
      generating the receive C/C signal; and transmitting the incoming signal based on the receive C/C signal.

5. The method as set forth in claim 1, wherein generating the transmit C/C weight comprises:
generating a transmit C/C signal at the base station;
providing the transmit C/C signal through a transmit chain of the base station to the antenna array of the base station;
transmitting the provided signal from the antenna array to the at least one second antenna coupled to the compensation processor;
receiving the transmitted signal at the compensation processor;
comparing the received signal to the transmit C/C signal at the compensation processor; and
generating at the compensation processor the transmit C/C weight based on the comparing of the received signal to the C/C signal.

6. The method as set forth in claim 5, wherein generating the transmit C/C weight further comprises:
providing the transmit C/C weight from the compensation processor to the base station; and
using the transmit C/C weight in a normal transmit operational mode of the base station.

7. The method as set forth in claim 1, wherein generating the receive C/C weight comprises:
generating a receive C/C signal at a compensation processor;
transmitting the receive C/C signal from the at least one second antenna coupled to the compensation processor to the antenna array of the base station;
receiving the transmitted signal at the antenna array;
supplying the transmitted signal from the antenna array through a receive chain of the base station to a receive processor of the base station;
processing the supplied signal at the receive processor;
providing the processed signal from the receive processor to the compensation processor;
comparing the provided signal to the receive C/C signal at the compensation processor; and
generating at the compensation processor, a receive C/C weight based on the comparing of the provided signal to the C/C signal.

8. The method as set forth in claim 7, wherein generating the receive C/C weight further comprises:
providing the receive C/C weight from the compensation processor to the base station; and
using the receive C/C weight in a normal receive operational mode of the base station.

9. A method of providing digital compensation and vector calibration for a base station coupled to an antenna array, the method comprising:
generating a final training sequence, the final training sequence associated with one of a transmit chain and a receive chain;
transmitting a radio frequency (RF) signal based on the final training sequence through the antenna array;
receiving the RF signal through at least one second antenna that is separate from the antenna array;
processing the received RF signal by a processor that is integrated into the base station;
generating a transmit compensation/calibration (C/C) weight and a receive C/C weight associated with the transmit chain and the receive chain, respectively, based on the processed signal; and
directly applying the transmit C/C weight and the receive C/C weight to an outgoing baseband signal and a down-converted incoming signal, respectively, during normal operations of the base station to simultaneously provide both digital compensation and vector calibration.

10. The method as set forth in claim 9, wherein generating the final training sequence comprises:
for each of a plurality of training sequences, generating a value, $d_n$, where $d_n=1$, for n=1, 2, ..., 9 and $d_n=d_{n-4}+d_{n-9}$, for n=10, 11, ..., 2N;
for each of the training sequences, performing a dibit to 4-QAM modulation based on the value, $d_n$;
for each of the training sequences, generating a frequency-domain Orthogonal Frequency Division Multiplex (OFDM) waveform based on the 4-QAM modulation;
for each of the training sequences, performing an inverse Fast Fourier Transform on the frequency-domain OFDM waveform to generate a time-domain OFDM waveform, wherein the training sequences are further used to digitally equalize a transmit chain and a receive chain in the base station; and
generating the final training sequence based on the time-domain OFDM waveforms generated for each of the training sequences.

11. The method as set forth in claim 10, wherein generating the final training sequence comprises multiplying together each of the time-domain OFDM waveforms generated for each of the training sequences.

12. The method as set forth in claim 9, further comprising:
performing a Fast Fourier Transform on the processed signal to generate a first frequency-domain signal;
generating a second frequency-domain signal based on the first frequency-domain signal and the frequency-domain OFDM waveform;
performing a correlation on the second frequency-domain signal;
performing a frame alignment by Fast Fourier Transforming the correlated signal to generate a third frequency-domain signal; and
generating a C/C weight based on the third frequency-domain signal and the frequency-domain OFDM waveform.

13. The method as set forth in claim 12, further comprising:
multiplying the outgoing baseband signal by the C/C weight prior to up-converting to another RF signal the when the C/C weight is associated with the transmit chain; and
multiplying the down-converted incoming signal by the C/C weight when the C/C weight is associated with the receive chain.

14. The method as set forth in claim 10, the plurality of training sequences comprises 1,024 training sequences.

15. A system configured to provide digital compensation and vector calibration for a base station coupled to an antenna array, the system comprising:
a compensation processor (CP) transmit processor integrated into the base station, the CP transmit processor configured to generate a receive compensation/calibration (C/C) weight for use by the base station by processing incoming RF signals that were received from the antenna array, the incoming RF signals configured to be transmitted through at least one second antenna that is separate from the antenna array, the receive C/C weight configured to be directly applied to the incoming RF signals to simultaneously provide both digital compensation and vector calibration in a single process for a receive chain of the base station; and
a CP receive processor integrated into the base station, the CP receive processor configured to generate a transmit C/C weight for use by the base station by processing outgoing RF signals that were transmitted from the antenna array and received through the at least one second antenna, the transmit C/C weight configured to be directly applied to an outgoing baseband signal to simultaneously provide both digital compensation and vector calibration in a single process for a transmit chain of the base station.

16. The system as set forth in claim 15, further comprising:
a compensation processor comprising the CP transmit processor and the CP receive processor; and
a baseband module coupled to the compensation processor, the baseband module comprising a base station (BS) transmit processor configured to generate signals for transmission from the second antenna and a BS receive processor configured to process signals received at the base station.

17. The system as set forth in claim 16, wherein:
the baseband module is coupled to the antenna array;
the BS transmit processor being further configured to generate a C/C signal and provide the C/C signal through the transmit chain to the antenna array, the antenna array configured to transmit the provided C/C signal to at least one antenna coupled to the compensation processor; and
the compensation processor configured to receive the transmitted signal, the CP receive processor further configured to compare the received signal to the C/C signal and generate the transmit C/C weight based on the comparing of the received signal to the C/C signal.

18. The system as set forth in claim 17, wherein the compensation processor is further configured to provide the transmit C/C weight to the BS transmit processor and the BS transmit processor is further configured to use the transmit C/C weight in a normal transmit operational mode of the base station.

19. The system as set forth in claim 16, wherein:
the baseband module is coupled to the antenna array;
the compensation processor being configured to generate a C/C signal and transmit the C/C signal to the antenna array using the at least one second antenna, the antenna array configured to receive the transmitted signal and to supply the transmitted signal through the receive chain to the BS receive processor;
the BS receive processor being further configured to process the supplied signal and provide the processed signal to the CP transmit processor; and
the CP transmit processor further configured to compare the provided signal to the C/C signal and generate the receive C/C weight based on the comparing of the provided signal to the C/C signal.

20. The system as set forth in claim 19, wherein the compensation processor is further configured to provide the receive C/C weight to the BS receive processor and the BS receive processor further configured to use the receive C/C weight in a normal receive operational mode of the base station.

* * * * *

UNITED STATES PATENT AND TRADEMARK OFFICE
CERTIFICATE OF CORRECTION

| | | |
|---|---|---|
| PATENT NO. | : 8,295,884 B2 | Page 1 of 1 |
| APPLICATION NO. | : 11/284782 | |
| DATED | : October 23, 2012 | |
| INVENTOR(S) | : Trivedi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this
Twenty-sixth Day of August, 2014

Michelle K. Lee
*Deputy Director of the United States Patent and Trademark Office*